(12) United States Patent
McPherson (10) Patent No.: US 8,320,588 B2
(45) Date of Patent: Nov. 27, 2012

(54) MICROPHONE MOVER

(76) Inventor: Jerome Aby McPherson, Nashville, TN (US)

( * ) Notice: Subject to any disclaimer, the term of this patent is extended or adjusted under 35 U.S.C. 154(b) by 482 days.

(21) Appl. No.: 12/701,917

(22) Filed: Feb. 8, 2010

(65) Prior Publication Data

US 2010/0201807 A1    Aug. 12, 2010

Related U.S. Application Data

(60) Provisional application No. 61/151,392, filed on Feb. 10, 2009.

(51) Int. Cl.
*H04N 7/18* (2006.01)
*H04R 3/00* (2006.01)
*H04R 29/00* (2006.01)
*H03K 17/94* (2006.01)

(52) U.S. Cl. .......................... 381/122; 381/56
(58) Field of Classification Search ............. 381/369, 381/362, 122, 56; 335/220; 348/211, 118

See application file for complete search history.

(56) References Cited

U.S. PATENT DOCUMENTS

| | | | |
|---|---|---|---|
| 2,969,436 A | 1/1961 | Kilyk | |
| 3,007,014 A | 10/1961 | Bentman | |
| 5,406,638 A | 4/1995 | Hirschhorn | |
| 5,611,508 A * | 3/1997 | Palmero | 248/123.2 |
| 7,626,569 B2 * | 12/2009 | Lanier | 345/156 |
| 2003/0011685 A1 * | 1/2003 | Oka et al. | 348/211.2 |
| 2003/0090353 A1 * | 5/2003 | Robinson et al. | 335/220 |
| 2006/0269278 A1 * | 11/2006 | Kenoyer et al. | 396/428 |
| 2007/0195983 A1 * | 8/2007 | Klemme | 381/362 |
| 2008/0144876 A1 * | 6/2008 | Reining et al. | 381/369 |

* cited by examiner

*Primary Examiner* — Yuwen Pan
*Assistant Examiner* — Phan Le
(74) *Attorney, Agent, or Firm* — James Addison Barry, Jr.

(57) ABSTRACT

A system and a method for moving a microphone 100 in relation to a sound source 160 including: a microphone 140; moving the microphone in a dimension X-Y axis 110 or adding a third dimension 190; and an input system 150 operationally attached for adjusting the microphone in relation to the sound source and returning to desired locations. Features may further include: computer driven movement in the two or three dimension fields; a computer system 200 may retain locations and when requested return the microphone 140 to retained locations; the input system for control movement may be remote; and wherein the computer system 200 may position the microphone 140 for desired tones and effects.

17 Claims, 12 Drawing Sheets

MICROPHONE MOVER

CROSS-REFERENCE

This application claims the benefit of U.S. Provisional Application Ser. No. 61/151,392, filed Feb. 10, 2009, titled Remote Microphone Mover. The present application is related by the same inventor for all applications; Jerome Aby McPherson. The U.S. Provisional Application Ser. No. 61/151,392, filed Feb. 10, 2009, titled Remote Microphone Mover is hereby incorporated in its entirety by reference.

FIELD OF INVENTION

The present invention generally relates to controlling the movement of a microphone in relation to a sound source and more specifically a system and method for precise, movement of a microphone in a two or a three dimension area in relation to a sound source.

BACKGROUND OF INVENTION

There is a need for a better system and method for movement of a microphone in relation to a sound source wherein locations may be remembered and when requested the capability to move the microphone to the remembered locations. Current mechanisms only move microphones in a limited manner. Some mechanisms move the microphone in a single axis, for example to move a microphone up and down. This is typically used for public speaking where the microphone can be adjusted to accommodate the height of each person using the microphone.

SUMMARY

In the field of sound reproduction there is no "one correct" or positive microphone placement for locating a microphone in a correct position for a sound source. There are several "sweet spots" that exist in recording and finding the desired placement is a large part of the art of capturing and recording sound. An additional Z dimension movement or a third dimension in one embodiment allows the microphone to be placed closer to the audio source for a more "present" or "exact" sound, or refracted away from the source to introduce more "ambient" characteristics to the sound. In addition, these acoustic "sweet spots" or "correct" positions may need to be retained in a memory location in order to recall stored locations for both comparison and for returning to a previous desired sound. A device is needed that allows the user to position or remotely position the microphone in relation to a sound source for desired sound characteristics. There is also the need to control the movement of the microphone in relation to the sound source to receive and record special tones and effects created by the relationship of the microphone with the sound source. Additionally, a device is needed that allows the user to control the movement of a microphone or return a microphone to a retained or remembered location in relation to a sound source.

BRIEF DESCRIPTION OF THE DRAWINGS

The features, aspects, and advantages of the invention will become better understood with regard to the following description, appended claims, and accompanying drawings where:

DETAILED DESCRIPTION OF THE INVENTION

The present invention relates to the field of precisely controlling the movement of a microphone in relation to a sound source in two or three dimensions. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

DEFINITIONS

A pan-tilt mechanism: a device with a servo or stepper motor that allows an input system, including but not limited to a joystick, an internet enabled phone, and a computer system to reposition a microphone in a side to side X axis panoramic motion and in a front tilt Y axis motion which together may provide a means for moving the microphone in an X-Y axis in relation to a sound source.

An extension-retraction mechanism: a device including but not limited to an electro-mechanical actuator that produces movement in a linear fashion. This may produce a means for moving the microphone in a Z direction, dimension, or movement for an extension or a retraction movement of the microphone toward or away from the sound source. The extension-retraction mechanism may be mounted with mounting of the microphone, with the pan-tilt mechanism or platform, or incorporated into a boom for the microphone mounting.

A microphone: the component for capturing, or receiving, and reproducing sound. The microphone may consist of one or more microphones mounted on a microphone boom, an extension-retraction mechanism, or the means for remotely moving the microphone in relation to the sound source. The microphone may include both dynamic and phantom powered microphones.

Remote: the user is out of reach or away from the area wherein the user could manually move the microphone in relation to the sound source.

Retain: a means to note or save the specific location of the microphone in relation to the sound source. This may include but is not limited to X-Y coordinates within an area and may include Z coordinates within the area; the degrees of X-Y axis in relation with a zero reference point; saving manually the location of the microphone in relation to the sound source such that the user would be able to return the microphone in relation to the sound source to the saved location at a later time; saving a location in a joystick, input device or input system that may include a computer system at least one location in relation to the sound source such that the user may return a microphone to the saved location in relation to the sound source at a later time. The retained data may further include a description of the sound effects associated with the specific location retained.

Return: moving the microphone to a specific location previously noted, saved, or retained. The returning of the microphone in relation to the sound source may include but is not limited to moving the microphone in relation to the sound source with a joystick, a mouse, a trackball, and a computer device wherein the computer device may include a computer program for returning the microphone in relation to the sound source to the saved location.

Overview:

As depicted in FIGS. 1 through 6G, the structure of the microphone mover 100 includes: a microphone 140; a means for moving the microphone in an X-Y axis 110 in relation to a sound source 160; and an input system 150 for controlling the movement of the microphone to reposition the microphone in relation to a sound source 160 wherein the means for moving 110 the microphone in relation to a sound source 160, the microphone 140, and the input system 150 are operationally connected for moving or adjusting the position of the microphone in relation to a sound source 160 as controlled by the input system 150. Additional features may further include: an embodiment wherein the input system 150 may include but is not limited to a joystick, a computer system, an internet enabled phone, and an internet connection; and an embodiment wherein, a video camera 170 may be attached with the microphone 140. A monitor 180 may be operationally connected with the video camera 170 such that the user 210 may be visually assisted with the positioning of the microphone in relation to the sound source whether the user is close to the means for moving the microphone or remotely located. In addition to the less complex two dimensional axis of travel with an X-Y field or X-Y coordinates, a three dimensional axis of travel with an X-Y-Z field or X-Y-Z coordinates embodiment further includes: a means for moving the microphone within a Z dimension 190 in relation to the sound source 160; and an input system 150 for controlling the movement of the microphone 140 to reposition the microphone within a Z dimension 190 in relation to the sound source 160 wherein the means for moving the microphone in the Z dimension 190, the microphone 140, and the input system 150 are operationally connected for adjusting the position of the microphone in the Z dimension as controlled by the input system 150. The features of the microphone mover 100 may further include: remote movement of the microphone in the X-Y dimension or X-Y-Z dimension by a computer system 200 wherein the computer system may remember or retain locations and when requested, reposition or return the microphone to the remembered or retained location; and wherein the computer system may move or locate the microphone for predicted or determined desired tones and sound effects in relation to the sound source 160.

Embodiments of a System for Moving a Microphone in Relation to the Sound Source with Both a Two Dimensional and Three Dimensional System:

As illustrated in FIGS. 1 through 6G, a microphone mover system 100 for moving a microphone 140 in one embodiment comprises: a microphone 140; a means for moving and returning the microphone in an X-Y axis 110 in relation to a sound source 160; and an input system 150 for controlling the movement of the microphone in relation to a sound source 160 wherein the means for moving the microphone in the X-Y axis 110 and the input system 150 are operationally attached with the microphone 140 for adjusting the position of the microphone 140 in relation to a sound source 160 as controlled by the input system 150. Locations for the means for moving the microphone in an X-Y axis 110 and the microphone 140 may include but are not limited to the floor, the ceiling, the wall, pedestals, or sound sources and the means for moving the microphone 110 and the microphone 140 may be located either inside or outside of a building or room. The microphone mover system with two dimensions is an efficient way to position a microphone in relation to a sound source. The arc created by the pan feature allows the user to move the microphone closer or further away from the sound source by use of the arc without the extra expense of an additional dimension of movement such as a Z dimension. However, three dimensions of movement are available with the microphone mover system with another embodiment comprising three dimensions of movement instead of two dimensions of movement. A three dimension embodiment may further include a means for moving and returning the microphone in a Z dimension 190 in relation to the sound source 160; and an input system 150 for controlling the movement of the microphone in three dimensions in relation to a sound source 160 wherein the means for moving the microphone in the X-Y axis 110, and the Z dimension 190 and the input system 150 are operationally attached with the microphone 140 for adjusting the position of the microphone 140 in relation to a sound source 160 as controlled by the input system 150. As illustrated in FIGS. 2A and 2B, this embodiment of the microphone mover system 100 is shown wherein: the means for moving the microphone in an X-Y axis 110 in relation to the sound source 160 is a pan-tilt mechanism 110; the additional means for moving the microphone within a Z dimension 190 in relation to the sound source 160 may be an extension-retraction mechanism 190 attached with the microphone 140 for adjusting the position of the microphone 140 closer to the sound source or further away from the sound source 160; and the input system 150 may be a joystick operationally connected with the pan-tilt mechanism 110 and the extension-retraction mechanism 190 when included for controlling the movement of the microphone 140 within the three dimensions as desired by the user 210. The joystick for the X-Y axis or the X-Y-Z may be programmable to retain a location by selecting the location and naming the selection for recall and returning to the location at a later time as desired. The video camera 170 may be positioned to view the relative position between the microphone 140 and the sound source 160. One embodiment may include a video camera 170 attached with the microphone 140 wherein the video camera 170 may be operationally connected with a monitor 180 for visual assistance in positioning the microphone 140 in relation to the sound source 160. Still another embodiment may include the video camera 170 positioned in the general area of the microphone and sound sources to visually aid in moving the microphone 140 in relation to the sound source 160. Other embodiments with the video camera 170 may include but are not limited to the video camera 170 attached with the means for moving the microphone in the X-Y axis 110, attached with a base plate 112, attached with a pan-tilt mechanism 110, attached with the extension-retraction mechanism 190, or attached with the boom 138 for the microphone 140. To assist in repositioning the microphone 140, the monitor 180 may depict the video image of the camera 170 or the monitor 180 may depict the position or coordinates of the microphone 140 within the X-Y two dimensional or the X-Y-Z three dimensional areas. The monitor 180 may also graphically depict sound waves, volume or special characteristics from the sound source 160 as received by the microphone 140 in the current location within the two or three dimensional area.

Another embodiment may include a graphic user interface (GUI) 270. The graphic user interface 270 may be operationally connected with the computer processor 220 such that the graphic user interface 270 provides a graphic virtual view of sound sources 160 in relation to the microphone 140 for assisting the user 210 in moving the microphone 140 in relation to the sound source 160. The graphic user interface 270 may provided the user 210 with a presentation, or a graphic virtual view similar to a video game, or a virtual representation of the movement of the microphone mover 100 in relation to the sound source in a real time or actual sense. This allows the user 210 to graphically see where the microphone 140 is being positioned without having an actual video camera 170 mounted on the microphone 140 or in the area of the sound sources 160. In another embodiment of the microphone system 100 with the graphic user interface 270, the GUI 270 may be incorporated in the microphone mover system 100 in an audio plug-in that works inside an audio recording program allowing recorded audio to be manipulated and affected. A computer program may provide a computer based interface for positioning the microphone with memory locations selected using keystrokes. A graphic user interface may be operationally connected with the computer processor wherein the graphic user interface provides the user with a presentation or a virtual representation of the movement of the microphone mover 100 in relation to the sound source in a real time or actual sense.

In yet another embodiment as depicted in FIGS. 1 through 6G, the input system 150 may include a computer system 200 operationally connected with the microphone 140, wherein the means for moving the microphone in the X-Y axis in relation to the sound source 110, and the means for moving the microphone in the Z dimension in relation to the sound source 190 is such that the computer system 200 may precisely control the movement of microphone 140 as desired in relation to a sound source 160. The computer system 200 may include some or all of the following: a computer processor 220, an output device 230, a computer input device 240, a memory storage device 250, GUI, and a sound analyzer 260 operationally connected with the computer system 200. The computer input device 240 allows the user to communicate with the computer system 200. The computer input device 240 receives data entry 410 for input into the computer system 200. The computer processor 220 receives the data from the computer input device 240. The computer system memory and memory storage device 250 may be used for storing and retrieving data 410. The computer processor 220 may store the data with the memory/storage device 250 such that the data may be retrieved at a later time, or data may be used, for example, in controlling the movement of the microphone or analyzing the sound effects. The computer processor 220 may also be operationally connected with the computer input device 240 and the memory storage device 250 for determining the current location of the microphone, determining a desired location for the microphone position, and controlling microphone position movement to the desired location. If desired, the user 210 may select a starting location 420 and input the location to the computer system through the computer input device 240. The computer processor 220 may also have a designated starting location 420, or reference point such as the center of the two or three dimensional area. The computer processor 220 additionally may determine and retain or note the current coordinates or location of the microphone in relation to the sound source 430; control the movement of the microphone in relation to the sound source 440 to a desired location in relation to the sound source; record or retain the desired location of the microphone in relation to the sound source 450; and reposition or return the microphone in relation to the sound source to the previously recorded, noted, or retained position or the specific or noted desired sound effect location 460 in relation to the sound source. The output device 230 may be operationally connected with the computer processor 220 such that the output device 230 communicates with the means for moving the microphone in the X-Y axis 110, and the means for moving the microphone in the Z dimension 190 such that the computer processor 220 moves the microphone 140 to the desired location. The computer input device 240, the memory storage device 250, the computer processor 220, the sound analyzer 260, and the output device 230 may determine the locations for desired sound effects and control movement of the microphone in the two or three dimensional area. In this manner, the computer input device 240 receives data for the computer processor 220 for determining the desired microphone location. Additionally, the computer processor 220 with the sound analyzer 260 may determine the location for desired sound effects and the computer processor 220 may control the microphone movement of the microphone 140 in the two or three dimensional area to move the microphone 140 to the determined or calculated location in relation to the sound source 160 for the desired sound effect. By listening for quality, a musician as an artist has features for which the musician listens. These could be a lower sound or a brighter sound. The placement of the microphones gives the musician many more sounds and helps to shape sounds otherwise not available. This would be similar to giving an artist many more colors on the artist's palette with which to be creative. A computer program may be used in conjunction with the microphone mover system to aid the musician in determining the sound quality and equalization (EQ) desired.

Figure 1:
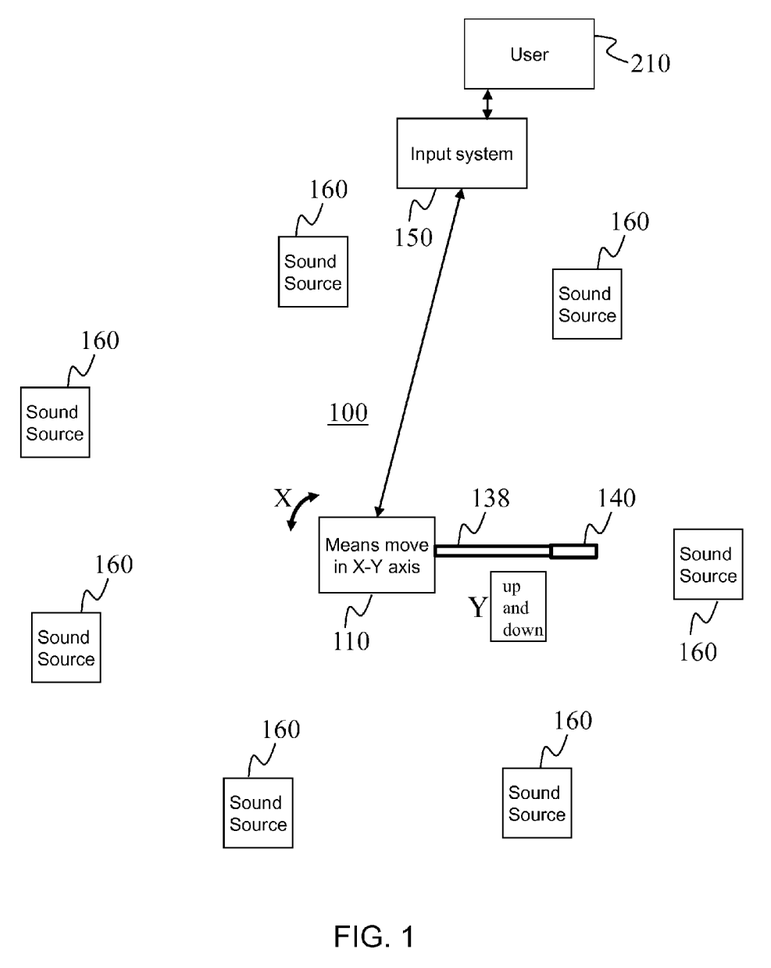
FIG. 1 is a top view of one embodiment of the microphone mover for moving the microphone in relation to a sound source depicting the X axis and the Y axis for a two dimensional system.
Figure 2A:
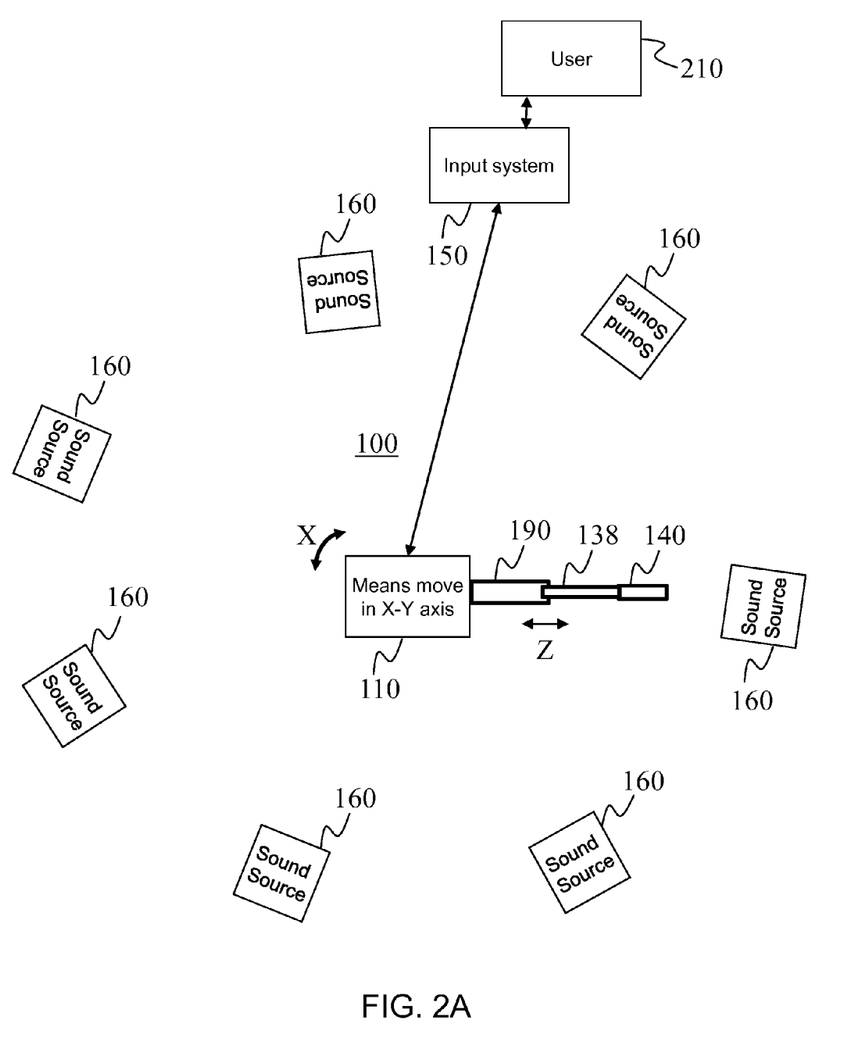
FIG. 2A is a top view of another embodiment of the microphone mover for moving the microphone in relation to the sound source depicting the X axis and the Z dimension for a three dimensional system.
Figure 2B:
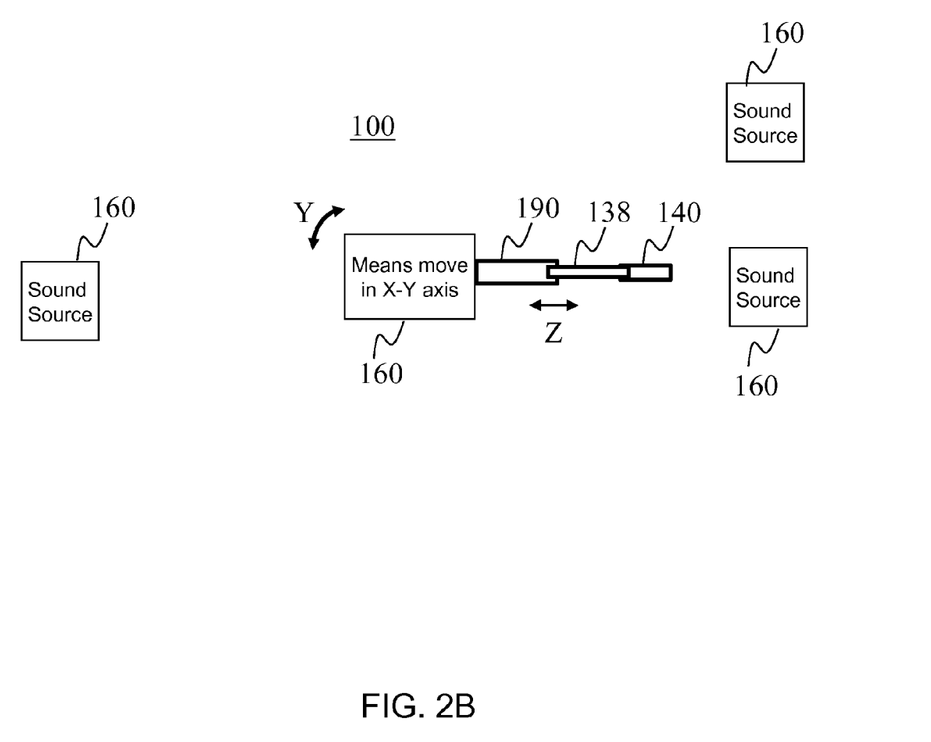
FIG. 2B is a side view of the embodiment of FIG. 2A depicting the Y axis and the Z dimension.
Figure 3A:
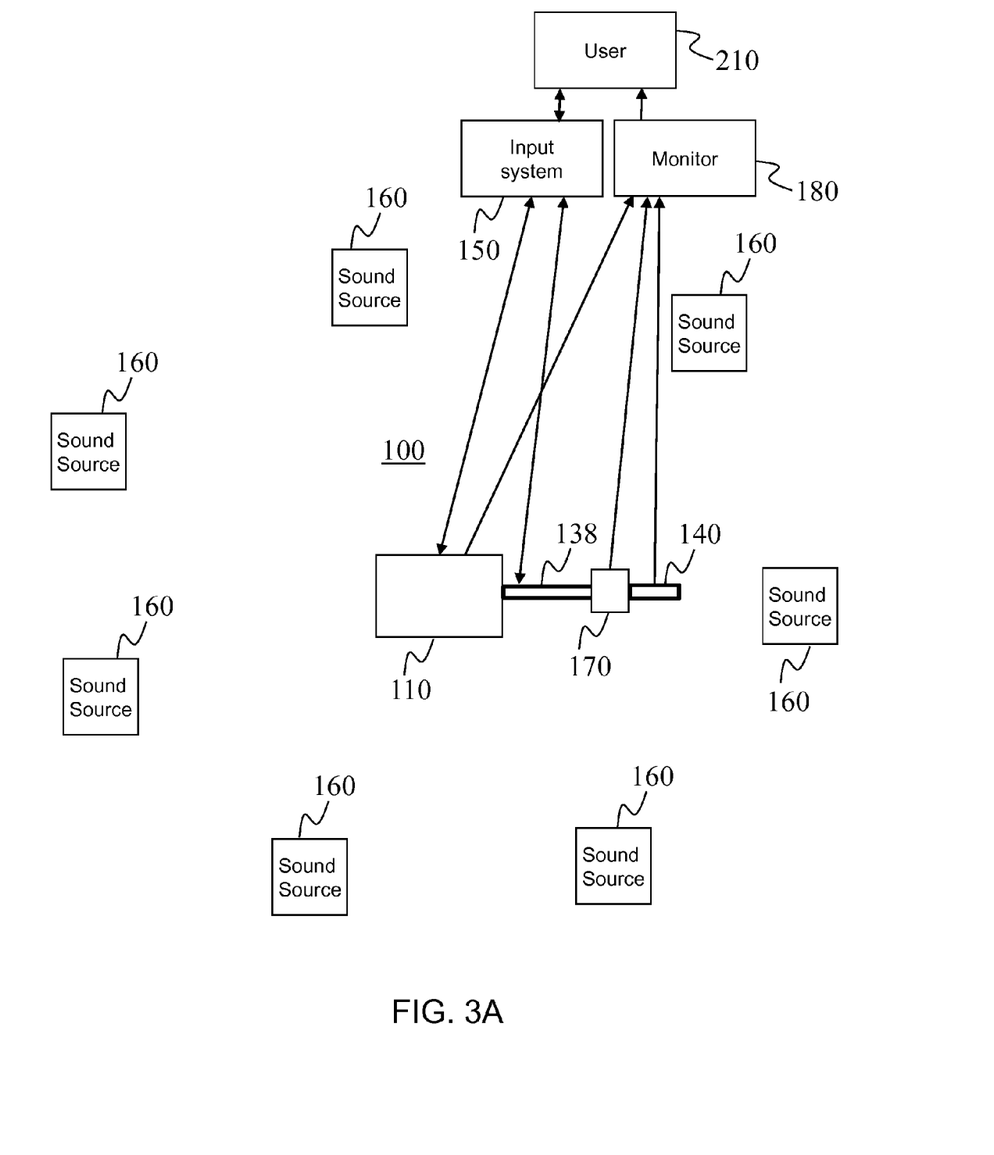
FIG. 3A is a diagram of another embodiment of the microphone mover for controlling the movement of the microphone in relation to the sound source in two dimensions.
Figure 3B:
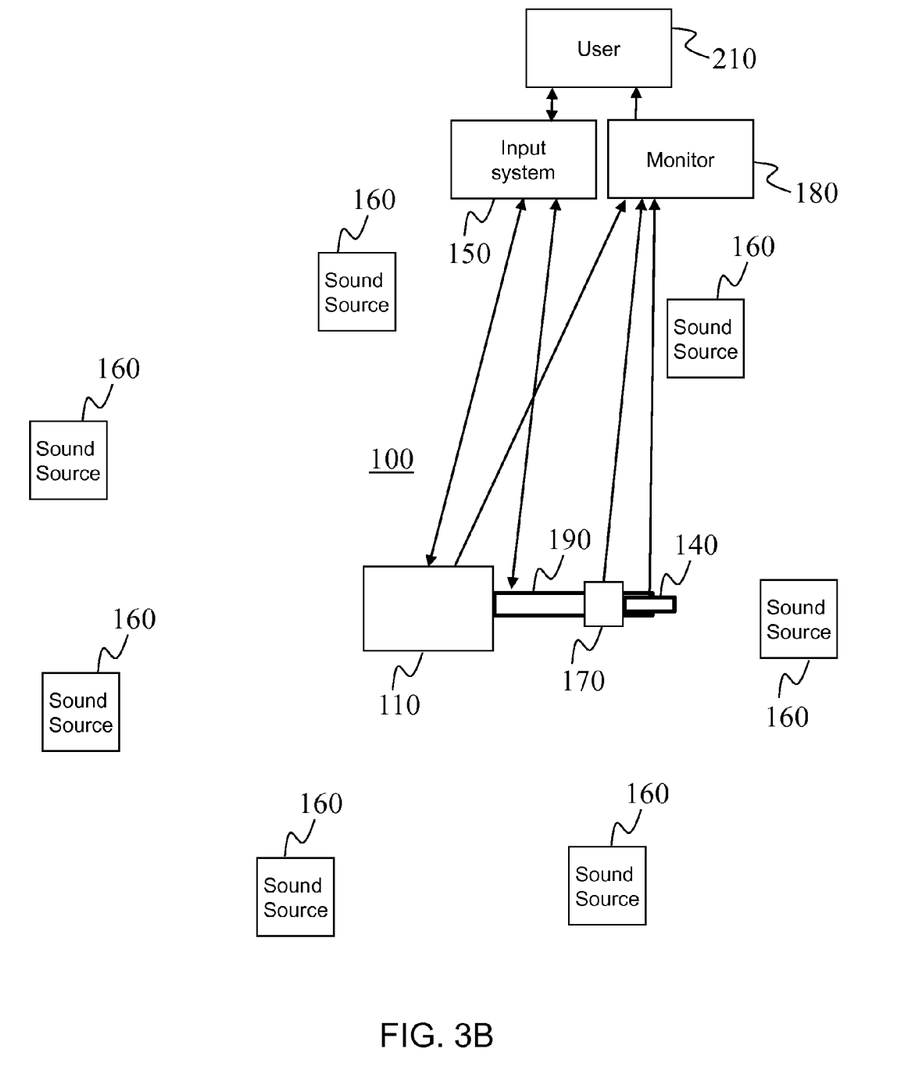
FIG. 3B is a diagram of another embodiment of the microphone mover for controlling the movement of the microphone in relation to the sound source in three dimensions.
Figure 4A:
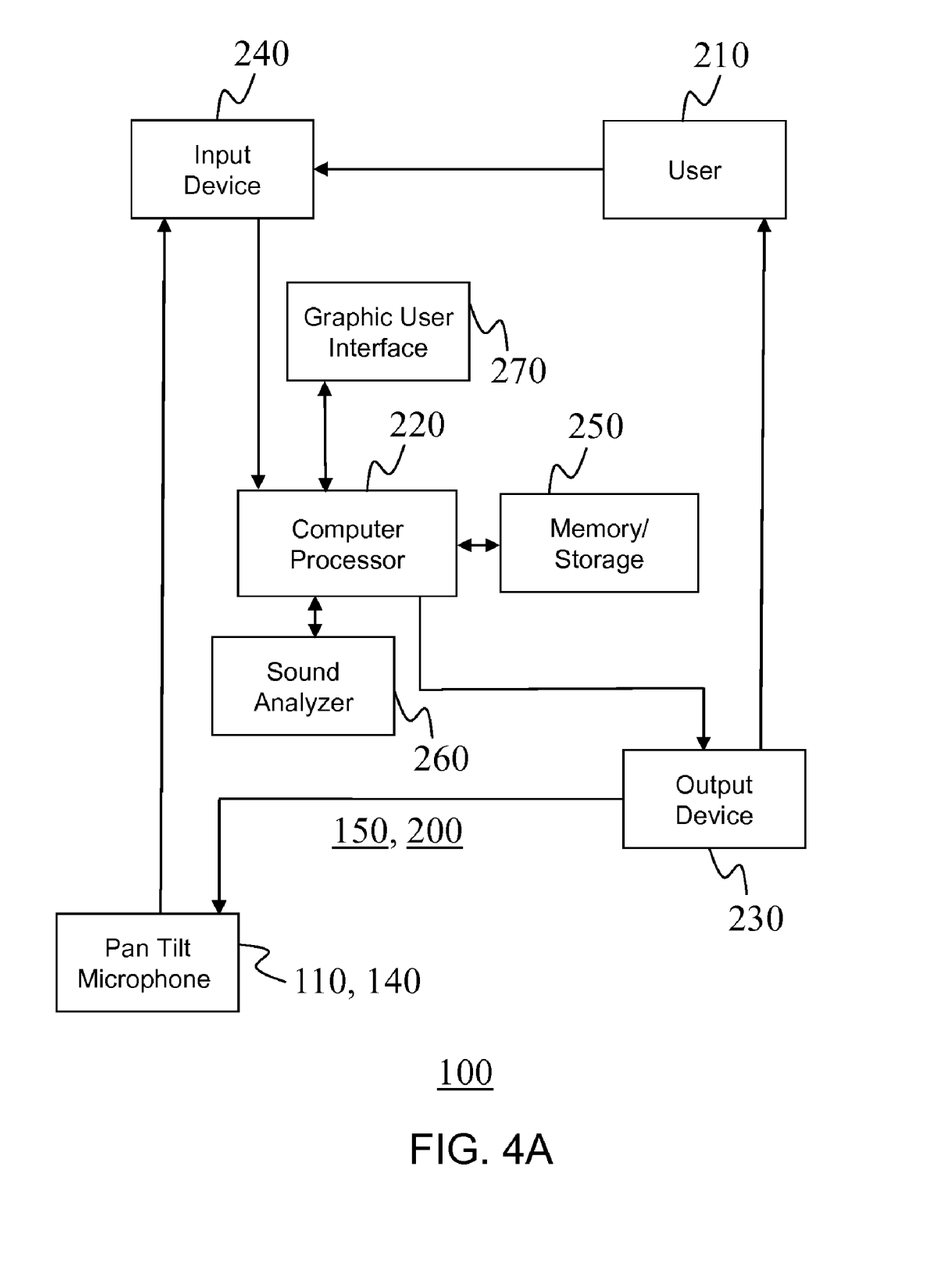
FIG. 4A is a block diagram of one embodiment of the microphone mover for controlling the movement of the microphone in relation to the sound source in two dimensions with a computer system.
Figure 4B:
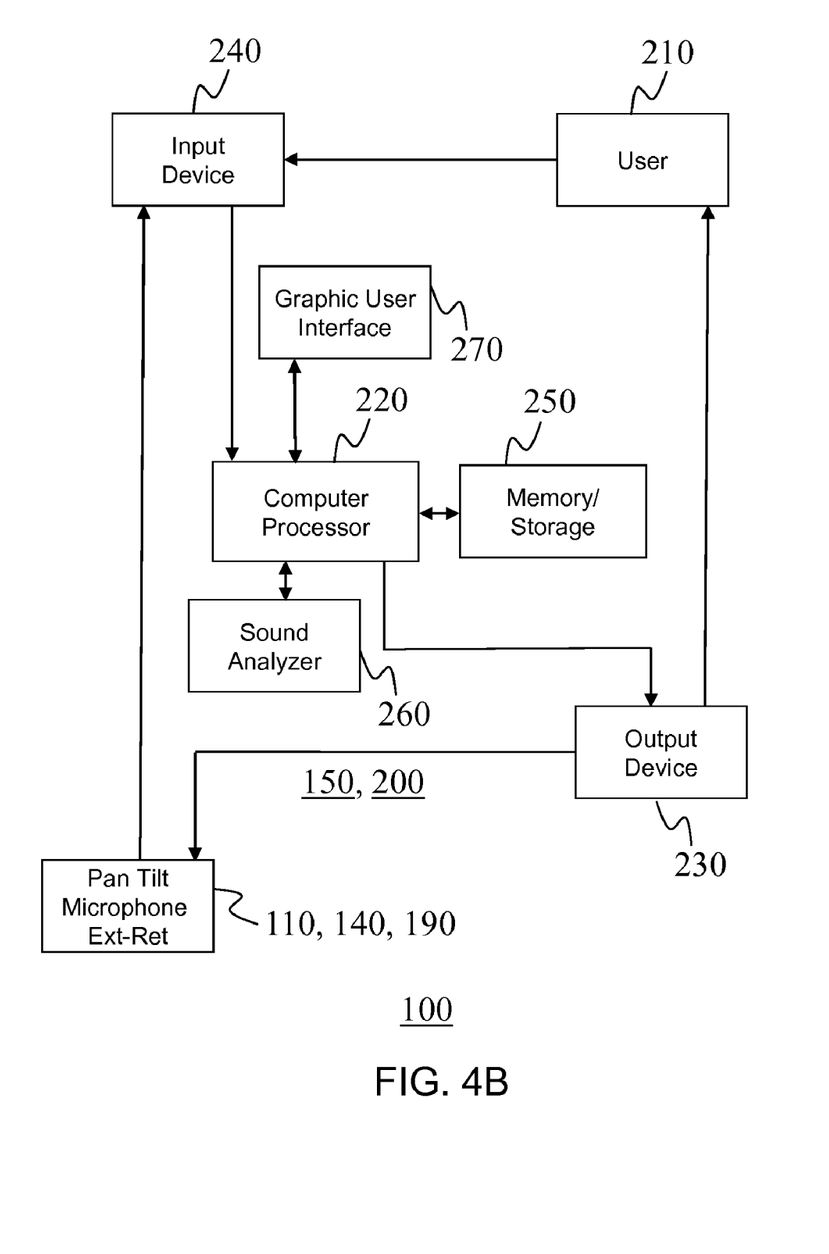
FIG. 4B is a block diagram of another embodiment of the microphone mover for controlling the movement of the microphone in relation to the sound source in three dimensions with a computer system.
Figure 5A:
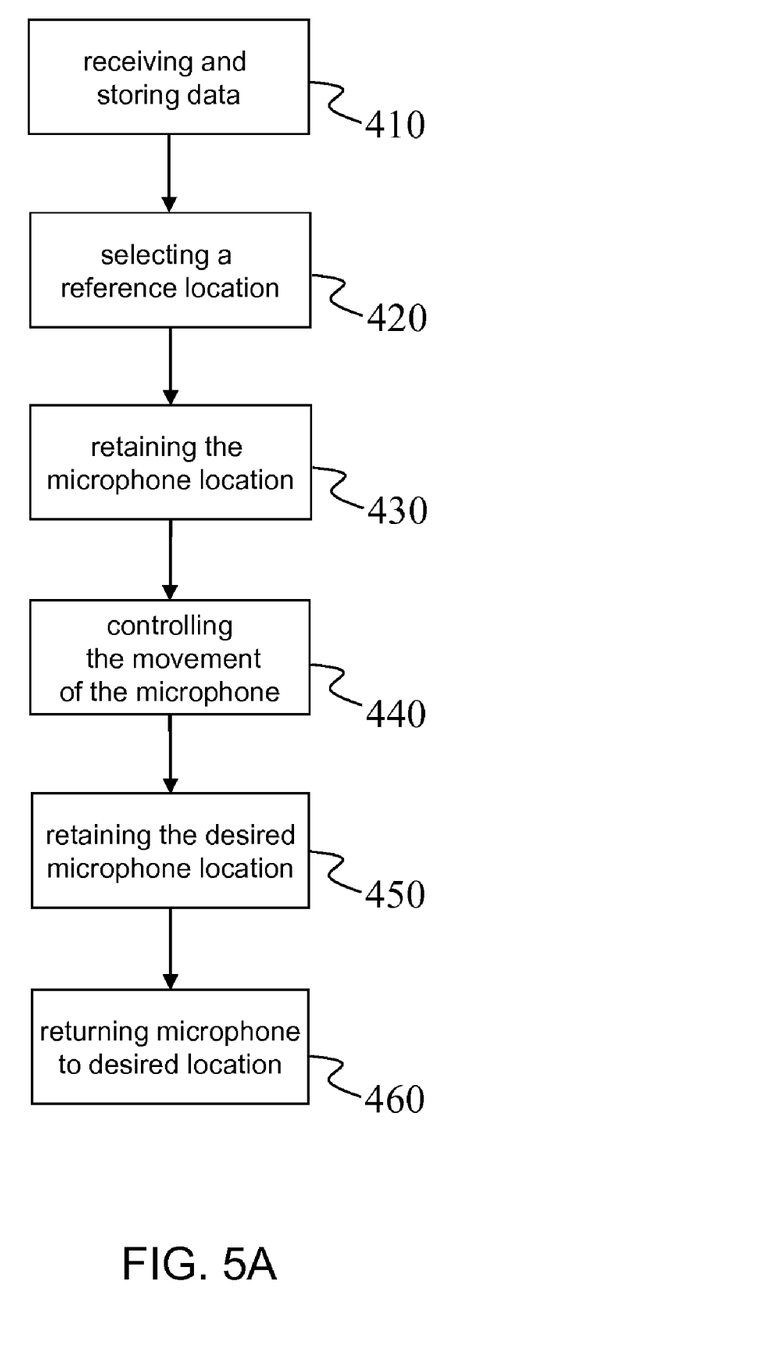
FIG. 5A is a flow chart illustrating a series of steps that may be used for remotely controlling the movement of the microphone in relation to a sound source in a two dimensional system.
Figure 5B:
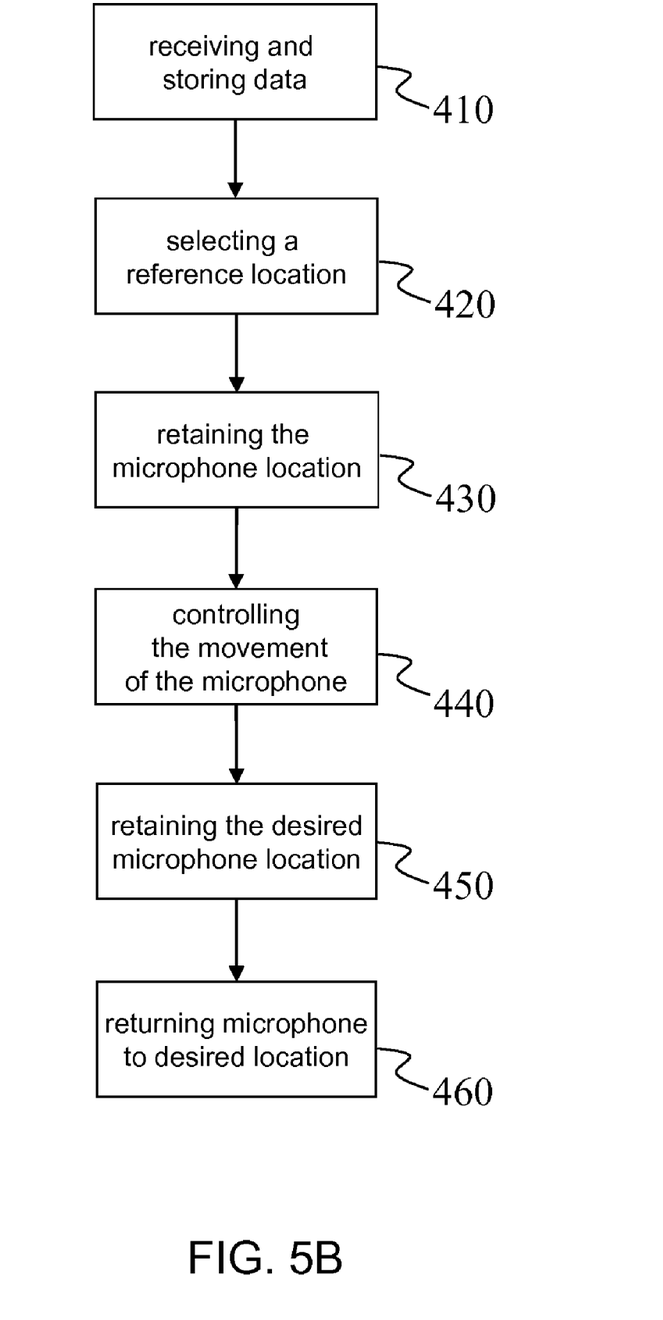
FIG. 5B is a flow chart illustrating a series of steps that may be used for remotely controlling the movement of the microphone in relation to a sound source in a three dimensional system.
Figure 6A:
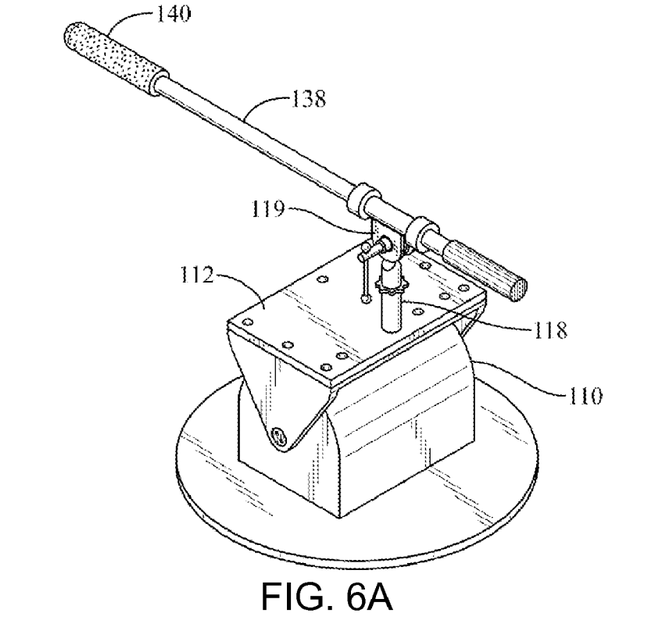
FIG. 6A is a perspective view of one embodiment using a pan-tilt mechanism illustrating a microphone mounting with the pan-tilt mechanism.
Figure 6B:
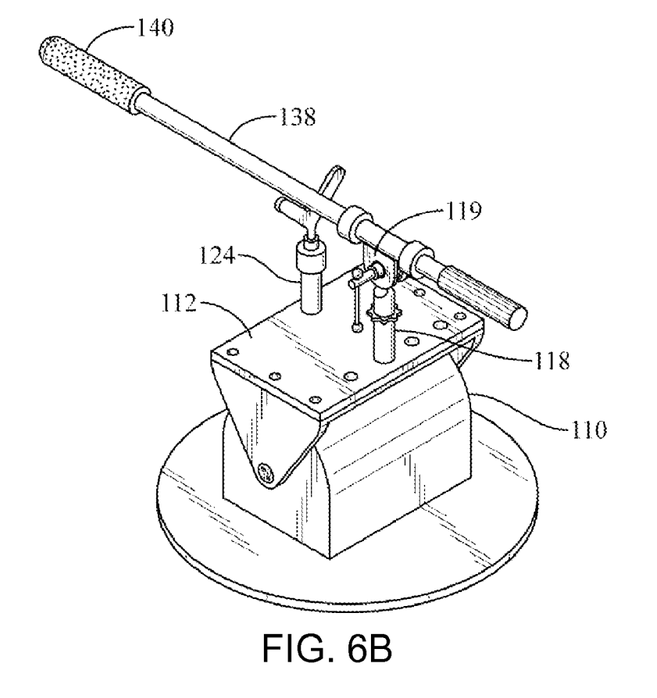
FIG. 6B is a perspective view of another embodiment using a pan-tilt mechanism for microphone mounting with an alignment post.
Figure 6C:
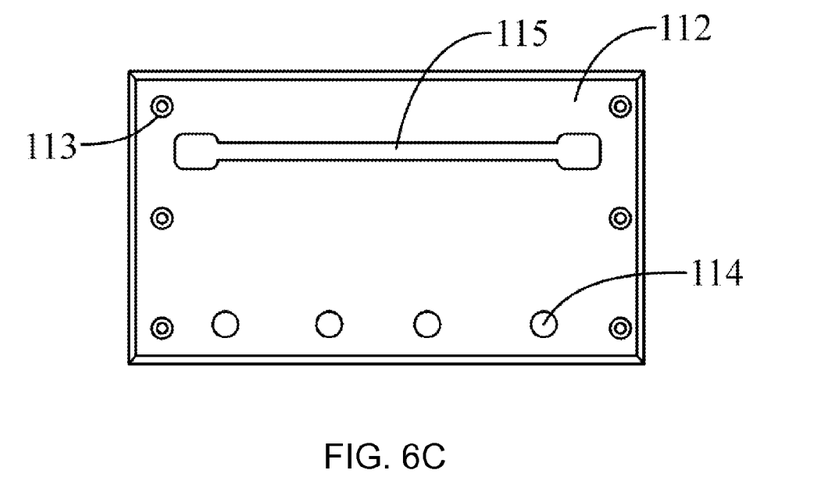
FIG. 6C is a top view of one embodiment of a base for mounting the pan-tilt mechanism with microphone.
Figure 6D:
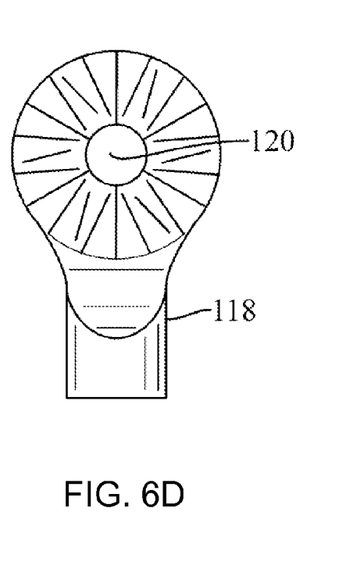
FIG. 6D is a front view of one embodiment of a boom post for mounting the pan-tilt mechanism with the microphone.
Figure 6E:
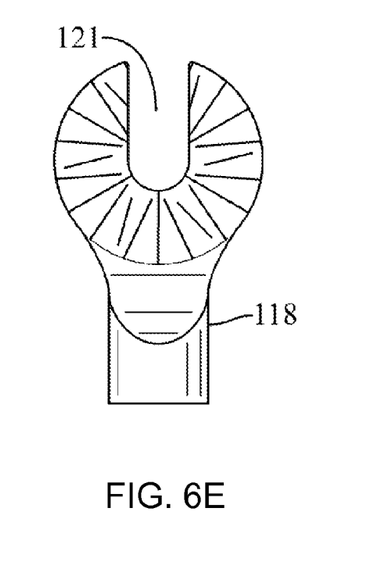
FIG. 6E is a front view of another embodiment of a boom post for mounting the pan-tilt mechanism with the microphone.
Figure 6F:
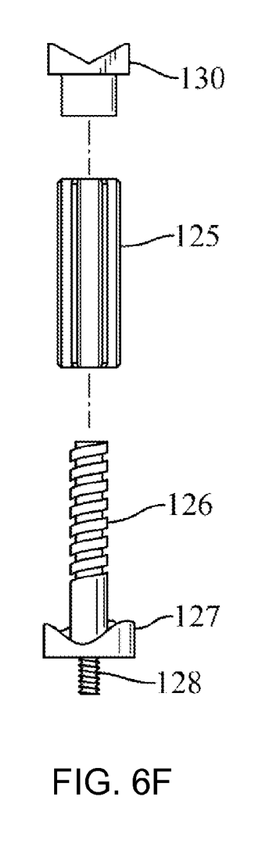
FIG. 6F is an exploded view of one embodiment of an alignment post that may be used with mounting the pan-tilt mechanism with the microphone.
Figure 6G:
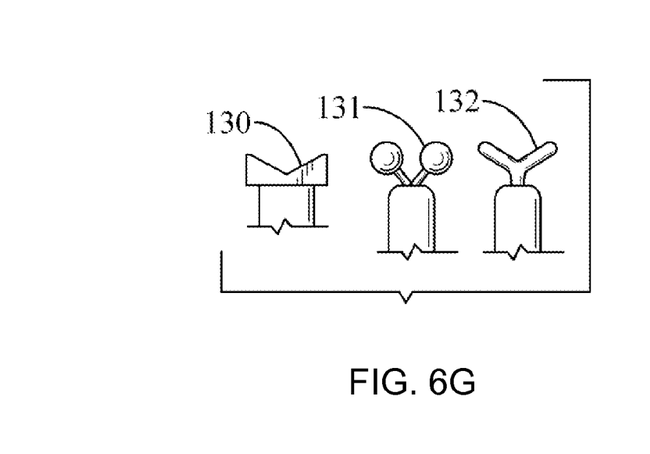
FIG. 6G illustrates several embodiments of V-shaped alignment mounts for the alignment post that may be used with mounting the pan-tilt mechanism with the microphone.

In one embodiment, a means for attaching the microphone with the means for moving a microphone in an X-Y axis 110 may include: a base plate 112 including apertures for mounting the base plate 113 with the pan-tilt mechanism 110 wherein the base plate 112 is attached with the pan-tilt mechanism 110; a boom post 118 attached with the base plate 112 with an aperture for mounting one or more boom posts 114; a boom for the microphone 138 attached with the boom post 118; and a microphone 140 attached with the boom for the microphone 138. In another embodiment, a means for connecting the microphone with the means for moving a microphone in an X-Y axis 110 may include: a base plate 112 attached with the pan-tilt mechanism 110; a boom post 118 attached with the base plate 112 using an aperture for mounting one or more boom posts 114; an alignment post 124 attached with the base plate 112 wherein the alignment post attaches with the slot for mounting one or more alignment post and providing adjustment 115 along the slot such that the boom 138 for the microphone may rest in the V-shaped top 130 of the alignment post 124 and the boom 138 and the microphone 140 returns to an aligned and adjusted starting position, a boom 138 for the microphone attached with the boom post 114; and a microphone 140 attached with the boom 138 for the microphone. FIG. 6G includes some samples and illustrations but does not limit all of the possible alignment post tops 130, 131, 132 that may be utilized for allowing the boom 138 to be pushed off the alignment post 124 when an obstacle is encountered during movement of the X-Y axis. FIG. 6F depicts an exploded view of one embodiment of an alignment post 124 that may include an outer post 125, an inner post 127, wherein the inner post 127 may include an upper threaded portion 126 for attachment and adjustment with the outer post 125 and a lower threaded portion 128 for attaching with the base plate 112. A grip 129 for adjusting the tension of the alignment post 124 may also be included. With embodiments including the alignment post 124: the boom post tension means 119 is not required to have as much tension to maintain the approximate horizontal position; and if the microphone 140 or boom 138 encounter an obstacle during movement, the boom 138 is merely pushed off the alignment post 124 without changing the preset positions such that the boom 138 may be replaced on the alignment post 124 and the system is ready to continue without the need to recalculate the original settings. The boom post 118 may include an aperture 120 near the top of the boom post 118 for accepting a fastener for adjusting the tension 119 of the attachment of the boom with the boom post 118. In another embodiment the boom post 118 may include a slot 121 for easier attachment of the boom 138 and the boom post 118.

Embodiments of a Method for Moving a Microphone with Both a Two Dimensional and Three Dimensional System:

In another embodiment as illustrated in FIGS. 1 through 5B, a method for moving a microphone 140 in relation to a sound source 160 may comprise the steps of: receiving through an input device and storing data with the memory and storage device 410; selecting a microphone reference point location as a starting location 420 or a location in the X-Y axis or X-Y-Z axis or from another perspective in the two or three dimensional area that will be used as a reference point for the microphone mover; retaining the location for the microphone in relation to the sound source 430; controlling the movement of the microphone 140 in relation with the sound source 160 with the input system 150 such that the location of the microphone in relation with the sound source is positioned for a desired sound effect 440; retaining the location of the microphone 140 in relation to the sound source 160 for the desired sound effect 450 or the sound effect achieved; and returning to the location of the microphone in relation to the sound source for the desired sound effect 460. The preceding steps may be used in a two or three dimensional method wherein the three dimensional method adds the additional dimension. A video camera 170 may be mounted on the microphone 140 or the moving arm of the pan-tilt mechanism 110, or when included the extension-retraction mechanism 190, to assist in the controlling the movement of the microphone 440, and the returning the microphone to the desired location 460 steps. A joystick 150 may assist in controlling the movement of the microphone in relation to the sound source 160 with the pan-tilt mechanism 110 and the extension-retraction mechanism 190 of step 440, and the returning the microphone to the desired location of step 460. Before setting up the microphone mover 100, it may be desirable for the device to be in a "neutral" location. The neutral location may be, where the microphone 140 is in the halfway point in relation to the X axis (or horizontal pan movement), and parallel to the ground in relation to the Y axis (or front/back tilt movement). When the Z dimension is included, the extension-retraction mechanism 190 neutral location may be fully extended or retracted in relation to the Z dimension (or near/far position). The microphone mover system 100 may be placed to allow the microphone 140 to be in front of and in very close proximity of the sound source 160 including but not limited to a drum, piano, guitar, or guitar amp. The microphone 140 may be initially positioned at an appropriate height in relation to the sound source 160. The microphone mover system 100 could be placed on the ground or on an object such as a block or box to elevate it to so the microphone can reach a higher target point in relation to the sound source 160. The user 210 may operate an input system 150 (including but not limited to a joystick or an internet enabled phone) that controls the microphone 140 two or three dimensional movement, and may then operate the input system 150 remotely from another location or room such as the engineer's listening position or a recording studio's control room. By using a line-of-sight or a video camera 170 mounted on the microphone mover system 100 showing the microphone's position in relation to the sound source on a monitor screen 180, the user 210 may listen and observe visually while remote and while simultaneously controlling the movement of the microphone 140. The user 210 may adjust the side to side, up/down, and near/far microphone position until a desired tonal characteristic is found and then store that microphone "sweet spot" in a memory location. When the user 210 achieves the memory location the user finds suitable, the user 210 may then recall the various memory locations in order to find a sound that is appropriate for the application for which it is being used. With a user searching for a special location, the microphone mover system allows the user the option of having the input system for controlling the movement of the microphone in the same area as the microphones and sound source or the input system may be remotely located as in a sound studio control room. In addition the microphone mover system may be operated remotely in another location via an internet connection and as needed the user may also use graphic interface, or a camera feed to the remote location.

Embodiments of Computer-Readable Mediums for a System for Moving a Microphone in the X-Y or X-Y-Z Field:

The term "computer-readable medium" or "machine-readable medium" is broadly defined to include any kind of computer memory such as floppy disks, conventional hard disks, CD-ROMS, Flash ROMS, nonvolatile ROM, and RAM.

As illustrated in FIGS. 1 through 5B, one embodiment includes a computer-readable medium having computer-executable instructions which when executed by a computer system 200 cause the computer processor 220 to perform operations that provide for moving a microphone 140, the computer-readable medium comprising instructions for: receiving and storing data input to the computer system 410; selecting a microphone reference point 420 located within the two or three dimensional area as a starting reference point; retaining the two or three dimensional location for the microphone in relation to the sound source position 430; controlling the movement of the microphone in relation to the sound source with the input system 150 such that the two or three dimension location of the microphone in relation to the source is positioned for a desired sound effect 440; retaining the two or three dimension location of the microphone in relation to the sound source for the desired sound effect 450; and returning to the two or three dimension location of the microphone in relation to the sound source for the desired sound effect 460.

Microphone Mover Additional Applications:

In one embodiment, the microphone mover 100 may be remotely controlled over the internet using an IP address control system, which opens up possibilities for using systems including but not limited to a wireless computer laptop, or a wireless internet enabled phone for controlling and storing memory locations.

Since the microphone 140 may swing in a circular motion in the pan movement or X-axis, another embodiment may include positioning other sound sources in a circular array around the microphone mover 100, thus eliminating the need for individual microphones 140 on each sound source 160. One embodiment may include a microphone 140, a means for moving the microphone in the X axis 110 in relation to the sound source 160, and an input system 150 operationally connected with the means for moving the microphone 110 for controlling the movement of the microphone in relation to the sound source 160 in the X dimension. The means for moving the microphone in only the X axis may include only the pan of the pan-tilt mechanism or another means may be used that moves in the X axis. Another application may include but is not limited to guitar amplifiers in a circle around the microphone mover 100. A user 210 may pan the microphone to the appropriate amplifier and the computer system 200 would be able to find and store those "sweet spots" for each amplifier. This improves the ability to make sound comparisons between amplifiers and save on the cost, setup, and logistical handling of many individual microphones on each amplifier.

In audio recording and sound reproduction, the placement of a microphone on a sound source determines its volume (amplitude) and tonal complexity (timbre). Due to the complexity of sound, in the case of miking a guitar amplifier, its tone varies widely depending on where the microphone is positioned in relation to the speaker. If the microphone is placed dead center in front of the speaker, the result is in a very bright sound. If the microphone is placed towards the outer edge of the speaker, the result is a dark tone. There is an infinite range of sounds to be had depending on where the microphone is placed. While there are controls on audio devices that allow you to vary the volume, treble, bass, panning, etc., there has been no control or knob to allow the user to change and alter that fundamental relationship of where a microphone is placed in relation to the sound source. In the past a person had to adjust the microphone position in relation to the sound source by hand or manually. If the person found a good quality sound, there would be a temptation to settle for that sound thus leaving the microphone in that location for fear that if a better sound were not found, the previous good sound would not be found again. The present invention allows a user to continually reposition a microphone in relation to the sound source while noting sound equalization (EQ) desired and then return to the most desirable sound quality or return to several of the most desirable sound qualities.

What is claimed is:

1. A microphone mover system for providing movement of a microphone comprising:
   the microphone;
   a means for moving the microphone in an X-Y axis in relation to a sound source;
   a means for moving the microphone in a Z dimension in relation to the sound source;
   a means to retain a location of a desired microphone position in relation to the sound source;
   a means to return the microphone to the location of the desired microphone position in relation to the sound source; and
   an input system to control the movement of the microphone in relation to the sound source for desired sound effects wherein the microphone, the means for moving the microphone in the X-Y axis, the means for moving the microphone in the Z dimension, the means to retain a location of a desired microphone position in relation to the sound source, the means to return the microphone to the location of the desired microphone position in relation to the sound source and the input system are operationally connected for retaining, moving, and returning the microphone in relation to the sound source in three dimensions.

2. The microphone mover system as set forth in claim 1 wherein:
   the means for moving the microphone in the X-Y axis is a pan-tilt mechanism; and
   the input system to control the movement of the microphone in relation to the sound source is a joystick.

3. The microphone mover system as set forth in claim 2 wherein the pan-tilt mechanism; the joystick; the means to retain the location of a desired microphone position in relation to the sound source; and the means to return the microphone to the location of the desired microphone position in relation to the sound source is included as a kit such that the microphone mover system may be assembly by a user.

4. The microphone mover system as set forth in claim 2 further comprising:
   a video camera and a monitor operationally connected with the video camera such that visual assistance is available for moving the microphone in relation to the sound source.

5. The microphone mover system as set forth in claim 2 wherein: the means for moving the microphone in the X-Y axis includes: a pan-tilt mechanism, and a means for attaching the microphone with the pan-tilt mechanism, wherein the means for attaching the microphone with the pan-tilt mechanism includes: a base plate attached with the pan-tilt mechanism, a boom post attached with the base plate, a boom attached with the boom post, and the microphone attached with the boom.

6. The microphone mover system as set forth in claim 1 wherein:
the input system to control the movement of the microphone in relation to the sound source further comprises a computer system such that the computer system: retains the location of the microphone in relation to the sound source, controls the movement of the microphone in relation to the sound source to a desired location in relation to the sound source, and returns the microphone in relation to the sound source to the noted desired location.

7. The microphone mover system as set forth in claim 6 wherein:
the means for moving the microphone in the X-Y axis includes: a means for remotely moving the microphone in the X-Y axis; and a pan-tilt mechanism, and a means for attaching the microphone with the pan-tilt mechanism, wherein the means for attaching the microphone with the pan-tilt mechanism includes: a base plate attached with the pan-tilt mechanism, a boom post attached with the base plate, an alignment post attached with the base plate, the alignment post including a V-shaped top, a boom attached with the boom post such that the boom is disposed in the V-shaped top of the alignment post, and the microphone attached with the boom; and
the input system comprises the means to remotely control the movement of the microphone in relation to the sound source.

8. The microphone mover system as set forth in claim 1 wherein:
the means for moving the microphone in the X-Y axis is a pan-tilt mechanism;
the means for moving the microphone in the Z dimension is an extension-retraction mechanism;
the input system to control the movement of the microphone to move the microphone in relation to the sound source is a joystick; and further comprising:
a means for attaching the microphone with the pan-tilt mechanism including: a base plate attached with the pan-tilt mechanism, a boom post attached with the base plate, an alignment post attached with the base plate, the alignment post including a V-shaped top, a boom attached with the boom post such that the boom is disposed in the V-shaped top of the alignment post, and the microphone attached with the boom.

9. The microphone mover system as set forth in claim 8 wherein:
a video camera attached with the microphone and a monitor operationally connected with the video camera such that visual assistance is available for moving the microphone in relation to the sound source.

10. The microphone mover system as set forth in claim 1 wherein:
the means for moving the microphone in the X-Y axis is a pan-tilt mechanism;
the means for moving the microphone in the Z dimension is an extension-retraction mechanism; and
the input system to control the movement of the microphone to move the microphone in relation to the sound source further comprises: a computer system such that the computer system: retains the location of the microphone in relation to the sound source, controls the movement of the microphone in relation to a sound source to a desired location in relation to the sound source, retains the desired location of the microphone in relation to the sound source, and returns the microphone in relation to the sound source to the noted desired location.

11. The microphone mover system as set forth in claim 10 wherein the computer system further comprises:
an input device for entering of data;
a memory storage device for storing and retrieving data;
a computer processor for: determining the location of the microphone in relation to the sound source, determining a desired location for the microphone in relation to the sound source, and controlling movement of the microphone to the desired location in relation to the sound source;
an output device wherein the output device communicates with the pan-tilt mechanism and the extension-retraction mechanism such that the microphone is moved in relation to the sound source to the desired location;
the input device, the memory storage device, the computer processor, and the output device are operationally connected such that: the input device receives data from a user and from the location of the microphone in relation to the sound source for storing and retrieving with the memory storage device, and for use with the computer processor in determining the desired microphone location in relation to the sound source, the computer processor receives stored data from the memory storage device and stores data in the memory storage device, and the output device receives data from the computer processor for moving the microphone in relation to the sound source; and
the computer processor determines the microphone in relation to the sound source location for desired sound effects and controls the microphone movement required for the system to move the microphone in relation to the sound source to that location.

12. The microphone mover system as set forth in claim 11 wherein the computer system includes a graphic user interface operationally connected with the computer processor wherein the graphic user interface provides a graphic virtual view of sound sources in relation to the microphone for assisting the user in moving the microphone in relation to the sound source.

13. The microphone mover system as set forth in claim 11 wherein the computer system includes a sound analyzer operationally connected with the computer processor such that the microphone mover system provides a means for determining the location for the microphone in relation to the sound source for desired sound effects.

14. A method for providing movement of a microphone with an input system and with a means for moving the microphone in relation to a sound source to a location, the method comprising the steps of:
retaining the three dimension location for the microphone in relation to the sound source;
controlling the movement of the microphone in relation to the sound source with the input system such that the three dimension location of the microphone in relation with the sound source is positioned for a desired sound effect;
retaining the three dimension location of the microphone in relation to the sound source for the desired sound effect; and
returning to the three dimension location of the microphone in relation to the sound source for the desired sound effect.

15. The method for providing movement of the microphone as set forth in claim 14 further includes a step of: selecting a microphone reference point location within the three dimension area as a starting reference point, before the retaining the three dimension location for the microphone in relation to the sound source step.

16. The method for providing movement of the microphone as set forth in claim 14 wherein the input system includes the computer system as set forth in claim 11 and the computer system method further includes the steps of: receiving data with the input device, and storing data with the memory and storage device, along with the steps of: selecting a microphone reference point three dimension location; retaining the three dimension location for the microphone in relation to the sound source; controlling the movement of the microphone in relation to the sound source with the input system such that the three dimension location of the microphone in relation with the sound source is positioned for a desired sound effect; retaining the three dimension location of the microphone in relation to the sound source for the desired sound effect; and returning to the three dimension location of the microphone in relation to the sound source for the desired sound effect.

17. A computer-readable medium having computer-executable instructions which when executed by a computer system cause the computer processor to perform operations that provide for microphone movement comprising:
  retaining the three dimension location for the microphone in relation to the sound source;
  controlling the three dimension movement of the microphone in relation to the sound source with the input system such that the three dimension location of the microphone in relation with the sound source is positioned for a desired sound effect;
  retaining the three dimension location of the microphone in relation to the sound source for the desired sound effect; and
  returning to the three dimension location of the microphone in relation to the sound source for the desired sound effect.

* * * * *